US012648643B2

(12) United States Patent
Contreras

(10) Patent No.: US 12,648,643 B2
(45) Date of Patent: Jun. 9, 2026

(54) ADJUSTABLE FULLY UPHOLSTERED CHAISE LOUNGER

(71) Applicant: Era Nouveau, LLC, Redondo Beach, CA (US)

(72) Inventor: John S. Contreras, Redondo Beach, CA (US)

(73) Assignee: Era Nouveau, LLC, Redondo Beach, CA (US)

( * ) Notice: Subject to any disclaimer, the term of this patent is extended or adjusted under 35 U.S.C. 154(b) by 0 days.

(21) Appl. No.: 18/533,119

(22) Filed: Dec. 7, 2023

(65) Prior Publication Data

US 2024/0172869 A1 May 30, 2024

Related U.S. Application Data

(63) Continuation of application No. 17/493,735, filed on Oct. 4, 2021, now Pat. No. 11,849,848, which is a continuation of application No. 16/113,033, filed on Aug. 27, 2018, now Pat. No. 11,134,779, which is a continuation of application No. 14/954,965, filed on Nov. 30, 2015, now Pat. No. 10,058,179.

(51) Int. Cl.

| | |
|---|---|
| ***A47C 1/14*** | (2006.01) |
| ***A47C 1/032*** | (2006.01) |
| ***A47C 15/00*** | (2006.01) |
| ***A47C 27/14*** | (2006.01) |
| ***A47C 27/15*** | (2006.01) |
| ***A61G 7/015*** | (2006.01) |

(52) U.S. Cl.

CPC .............. *A47C 1/032* (2013.01); *A47C 1/143* (2013.01); *A47C 15/002* (2013.01); *A47C 27/144* (2013.01); *A47C 27/15* (2013.01); *A61G 7/015* (2013.01)

(58) Field of Classification Search

CPC ...... A61G 7/015; A47C 1/143; B60N 2/5858; B60N 2/6063

See application file for complete search history.

(56) References Cited

U.S. PATENT DOCUMENTS

2014/0183926 A1* 7/2014 Wiegelmann ........ B60N 2/0284 297/452.48

FOREIGN PATENT DOCUMENTS

| | | | | |
|---|---|---|---|---|
| DE | 102012011989 A1 * | 12/2013 | ........... | B60N 2/0284 |
| KR | 101562741 B1 * | 10/2015 | | |
| WO | WO-2010091662 A1 * | 8/2010 | ........... | B60N 2/0284 |

* cited by examiner

*Primary Examiner* — Timothy J Brindley

(74) *Attorney, Agent, or Firm* — Kwan & Olynick LLP

(57) ABSTRACT

An adjustable fully upholstered chaise recliner is provided. The chaise comprises a stationary outer frame coupled to a platform. The platform is configured to move between a first position and a second position while the outer frame remains stationary. A cushion is coupled to the platform and is fully upholstered to the platform such that a cover material encloses the cushion and the platform. Movement of the platform causes one or more bending portions of the cushion to bend. The chaise further comprises one or more cords, each extending through the cushion with a first end coupled to the cover material and a second end coupled to the platform. The cords are configured to pull on the cover material such that movement of the platform from the first position to the second position does not result in bunching of the cover material near the bending portions of the cushion.

20 Claims, 9 Drawing Sheets

ADJUSTABLE FULLY UPHOLSTERED CHAISE LOUNGER

CROSS-REFERENCE TO RELATED APPLICATION

This application is a continuation of U.S. patent application Ser. No. 17/493,735, filed on Oct. 4, 2021 and entitled, "ADJUSTABLE FULLY UPHOLSTERED CHAISE LOUNGER", which is a continuation of U.S. patent application Ser. No. 16/113,033, filed on Aug. 27, 2018 and entitled, "ADJUSTABLE FULLY UPHOLSTERED CHAISE LOUNGER", now U.S. Pat. No. 11,134,779, Issued Oct. 5, 2021, which is a continuation of U.S. patent application Ser. No. 14/954,965, filed Nov. 30, 2015 now U.S. Pat. No. 10,058,179, Issued Aug. 28, 2018 and entitled, "ADJUSTABLE FULLY UPHOLSTERED CHAISE LOUNGER," the entirety of which are incorporated by reference for all purposes.

TECHNICAL FIELD

The present disclosure relates generally to fully upholstered furniture, and more specifically to chaise loungers.

DESCRIPTION OF RELATED ART

A chaise lounger, or chaise (sometimes referred to as a "chaise-longue"), is a reclining chair with an anatomical shape which allows the user to assume a semi-reclined resting position. A chaise is traditionally formed by multiple sections which are coupled to one another. The sections may be configured with different inclination: a first section for the support of a patient's back and head and a second section for the lower body and legs.

Typically, a chaise can be stand alone, or part of a sectional sofa. In some cases, chaises are adjustable. However, as previously mentioned, chaises typically consist of multiple sections. Thus, if a chaise is fully reclined, a user can feel the gaps where the different cushions of the different sections come together, leading to a less comfortable reclining experience. Therefore, there is a need for an adjustable chaise with a fully upholstered single cushion such that the user has an improved reclining experience.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide an adjustable chaise with self-adjusting upholstery. According to various embodiments, a chaise is provided including a stationary outer frame. In yet further embodiments, a sectional sofa is provided which comprises one or more seat sections and one or more chaise sections that comprise a stationary outer frame.

In some embodiments, a platform is coupled to the outer frame and is configured to move between a first position and a second position while the outer frame remains stationary. A cushion is coupled to the platform and is fully upholstered to the platform such that a cover material encloses the cushion and the platform. Movement of the platform causes one or more bending portions of the cushion to bend. The chaise further comprises one or more cords, each extending through the cushion with a first end coupled to the cover material and a second end coupled to the platform. The cords are configured to pull on the cover material such that movement of the platform from the first position to the second position does not result in a bunching of the cover material near the bending portions of the cushion.

In some embodiments, movement of the platform from the first position to the second position may cause the cords to pull a portion of the cover material towards the platform to prevent bunching of the cover material at the bending portions. In other embodiments, the platform may comprise a plurality of sections, including a head section coupled to a body section. Movement of the head section relative to the body section may cause bending portions of the cushion to bend near the coupling point of the head section and the body section. In further embodiments, the platform may further comprise a foot section coupled to the body section. This foot section may be independently moveable from the body section and the head section such that the platform is configured to move to a third position and a fourth position. Movement of the foot section relative to the body section may cause bending portions of the cushion to bend near the coupling point of the foot section and the body section.

In other embodiments, the cushion may include one or more layers of cushion material including a cavity layer. The cavity layer may include one or more cavities that are substantially aligned with one or more cords such that each cord passes through a cavity while extending through the cushion. In certain embodiments, the bottom surface of the cavity layer may be closer to the platform than the top surface of the cavity layer. In some embodiments, the cavities may begin at the top surface of the cavity layer and extend into, but not all the way through, the cavity layer. The width of each cavity may be wider at the top surface of the cavity layer than its width near the bottom surface of the cavity layer. In some embodiments, the cavities may be substantially aligned with one or more bending portions of the cushion.

In other embodiments, the cords may be arranged to maintain an adjustable surface tension on the cover material. In such embodiments, the surface tension of the cover material may adjust as the platform moves such that there is no pinching or bunching of the cover material. In further embodiments, the chaise may include a first row of cords and a second row of cords arranged such that a greater amount of tension is applied to the second row of cords than the first row of cords when the platform moves from the first position to the second position. This difference in tension may cause the cords to pull on the cover material unequally such that the cover material forms a flap that folds over a portion of the cover material near the one or more bending portions of the cushion. In further embodiments, the chaise may further comprise a motor arrangement that may cause one or more sections of the platform to move into one or more configurable positions by automated electronic movement.

In yet a further embodiment, a method of assembling a chaise is provided. The method comprises coupling a platform to an outer frame such that the platform is configured to move between a first position and a second position while the outer frame remains stationary. The method further comprises coupling a cushion to the platform. The cushion is fully upholstered to the platform such that a cover material encloses the cushion and the platform. Movement of the platform causes one or more bending portions of the cushion to bend. The method further comprises extending one or more cords through the cushion by coupling a first end of each cord to the cover material and coupling a second end of each cord to the platform. The cords are configured to pull on the cover material such that movement of the platform from the first position to the second position does not result in bunching of the cover material near the one or more bending portions of the cushion.

BRIEF DESCRIPTION OF THE DRAWINGS

The disclosure may best be understood by reference to the following description taken in conjunction with the accompanying drawings, which illustrate particular embodiments of the present disclosure.

DESCRIPTION OF PARTICULAR EMBODIMENTS

Figure 1:
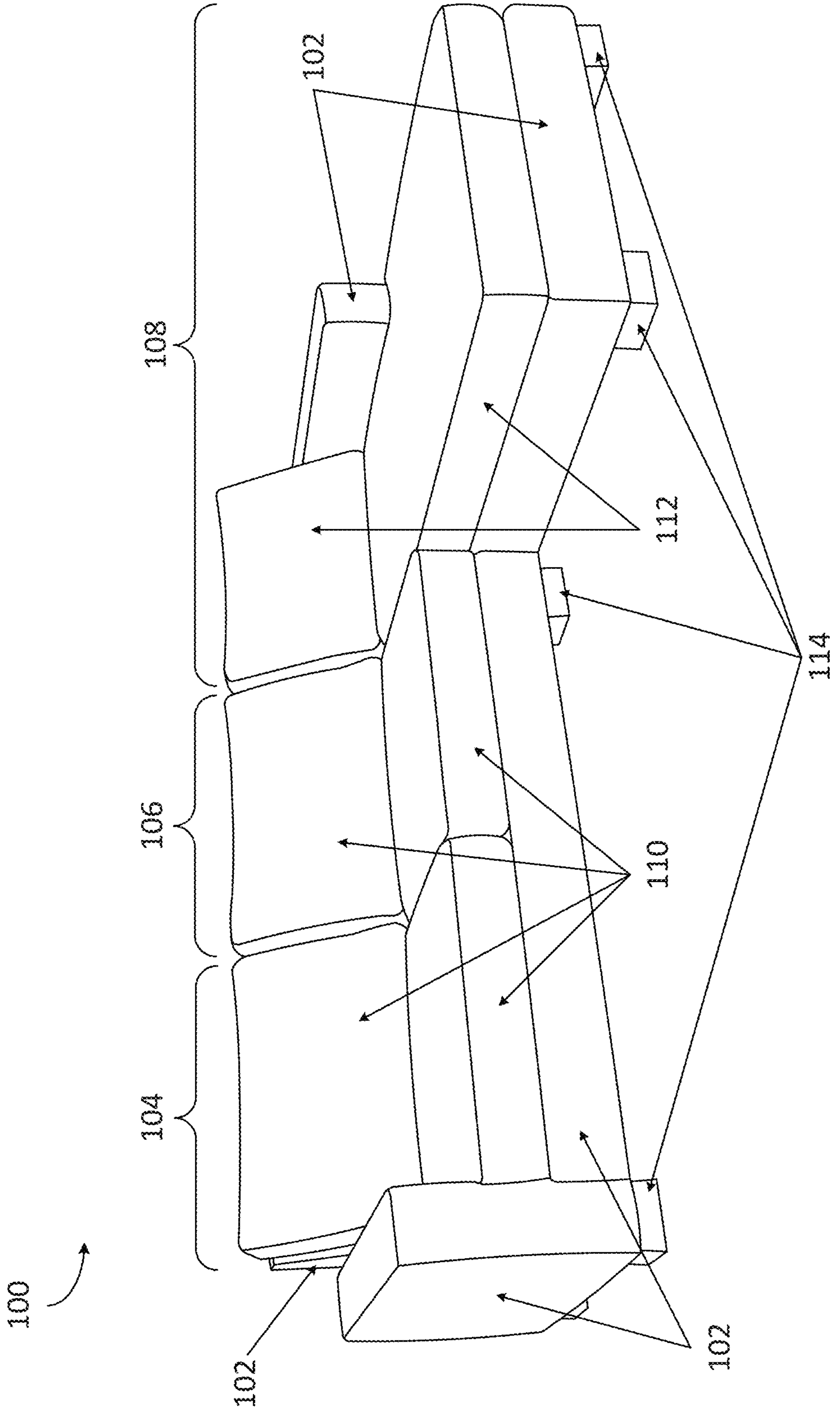
FIG. 1 illustrates one example of a sectional sofa including a chaise section, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular mechanical configurations. However, it should be noted that the techniques of the present disclosure apply to variations of mechanical configurations. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "chaise," "chaise lounger," and "chaise-longue" are used interchangeably. Various techniques and mechanisms of the present invention will sometimes be described in singular form for clarity. However, it should be noted that some embodiments include multiple iterations of a structure or multiple instantiations of a mechanism unless noted otherwise. For example, a system may use a processor in a variety of contexts where mechanisms are controlled automatically, electronically, or wirelessly. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a chaise recliner with self-adjusting upholstery is provided. The chaise comprises a stationary outer frame coupled to a platform. The platform is configured to move between a first position and a second position while the outer frame remains stationary. A cushion is coupled to the platform and is fully upholstered to the platform such that a cover material encloses the cushion and the platform. Movement of the platform causes one or more bending portions of the cushion to bend. The chaise further comprises one or more cords, each extending through the cushion with a first end coupled to the cover material and a second end coupled to the platform. The cords are configured to pull on the cover material such that movement of the platform from the first position to the second position does not result in bunching of the cover material near the bending portions of the cushion.

Example Embodiments

According to various embodiments, a chaise, or chaise-longue, may comprise a platform formed by multiple sections. The multiple sections may include a head section and a body section which may be coupled together such that each section may be moved in connection with and relative to the other. In some embodiments, a user may sit on the body section with the user's back and head resting on the head section. In other embodiments, the platform may comprise additional sections. In certain embodiments, the head section and body section may be coupled by a hinge mechanism upon which the sections may swivel. In various embodiments, the chaise may be configured to be arranged in a plurality of positions through the movement of the platform sections. The top surface of the platform forms the surface upon which a user may sit on the chaise in a plurality of positions including seated, semi-reclined, supine, and/or zero-gravity positions. In other embodiments, the platform may be configured to be arranged in a number of other positions for a user.

In some embodiments, the chaise may be fully upholstered with a cushion on the top surface of the platform and a cover material fully enclosing the cushion and the platform. In some embodiments, the cushion may be completely attached to the platform such that there are no gaps between the bottom surface of the cushion and the top surface of each section of the platform. In other embodiments, the cover material may or may not fully enclose the platform. In some embodiments, the cover material encloses at least the top surface of the cushion and the top surface of the platform. In some embodiments, the movement of the platform to one or more different positions causes portions of the cushion and cover material to bend. For example, the chaise may be in a lay flat position, in which the head section and the body section are substantially horizontal and in-line with each other. From the flat position, the chaise may be moved into a seated position, in which the head section is raised upward while the body section remains in a substantially horizontal position. This movement may cause portions of the cushion and cover material to bend near the coupling point of the head section and the body section. Because the angle between the head section and the body section on the topside of the chaise decreases when the chaise moves into the seated position, there may be a natural tendency for the cover material and/or cushion to bunch at or near these bending portions.

To prevent bunching of the cover material, one or more cords may be extended through the cushion with a first end of each cord coupled to the cover material and a second end of each cord coupled to the platform. In various embodiments, the cords may be attached to any section of the platform. In some embodiments the cords may be coupled to the cover material by stitching or other suitable method of attachment. In some embodiments, the cords may be stitched at intervals over the surface of the cover material to create a tufted appearance. For example, the cords may be under tension such that an indentation may form at the attachment point where each cord attaches to the cover material. Creases may also form that connect each attachment point to form a tufted appearance. In various embodiments, the cords may be arranged to achieve a desired aesthetic formation. In some embodiments, the cords may be attached to the cover material by button tufting. For example, button forms may be used, which may comprise metal button blanks that may be covered with the same or contrasting fabric to the cover material. The button forms may be a shank-style button, which includes a metal, plastic, or wire loop through which a thread or cord is fed and then passed through the one or more layers of the cushion. In other embodiments, the cords may be arranged closely together in rows such that a single crease may appear along the cover material at the attachment points of each row of cords, instead of a single indentation at each attachment point.

According to various embodiments, the cords are arranged to maintain an appropriate tension at each configurable position of the chaise such that a desired surface tension of the cushion and cover material is felt by a user sitting on the chaise. For example, in the flat position, the cords may pull on the cover material such that upholstered chaise maintains a desirable tufted appearance. In the seated position, the cords may pull on the cover material such that bunching of the cover material at or near the bending portions of the cushion is prevented or hidden. In some embodiments, slight bunching of the cover material may occur when the chaise is in the seated position, but the bunching may not be visible to or may not be felt by a user sitting on the chaise. In various embodiments, the tension of the cords maintain the aesthetic lines of the chaise and provide the user with a feeling of a single continuous cushion with consistent surface tension and smooth upholstery.

In various embodiments, the tension of the cords may adjust as the chaise is moved into different positions. For example, the cords may be under increased tension in the seated position compared to the flat position. The chaise may comprise two rows of one or more cords extending through the cushion near the coupling point of the head section and the body section. The rows of cords run along the width of the upholstered chaise with a top row of cords located closer to the top end of the head section of the chaise than the bottom row of cords. In various examples, each of the two rows of cords may be coupled to either the head section or the body section of the platform. The two rows of cords may be arranged such that an even tufted appearance occurs when the chaise is in a flat position. As the chaise section is moved into a seated position, the head section is raised upward toward a more vertical alignment while the body section remains in a substantially horizontal position. The movement of the platform may pull the cords toward the platform and increase the indentation and creases formed by the attachment points in the cover material. In this way, the cords may pull the cover material inward such that the attachment points of the cords and portions of the cover material located between the two rows of cords are hidden by other portions of the cover material that are not pulled by the cords, which may fold over the attachment points to form an uninterrupted crease. In some embodiments, because the outer frame of the chaise remains still, the platform sections, while moving into the seated position, also shift together towards the backrest of the outer frame in order to form a seated position against the backrest of the outer frame without a substantial gap between the head portion of the cushion and the backrest of the outer frame.

In various embodiments, the cords may be arranged to adjust tension independently and pull on the cover material unevenly. Referring to the previous example, as the chaise section is moved into a seated position, the movement of the platform sections relative to each other may pull the bottom row of cords with more tension than the top row of cords. This difference in tension may cause the cords to pull on the cover material unequally with the bottom row of cords pulling the cover material and upper cushion material toward the platform to a greater degree. In this way the difference in tension may promote folding of the cover material to remove and/or hide bunching of the cover material.

In various embodiments, the cushion may include one or more layers, each consisting of the same or different material. In other embodiments, the cushion comprises a singular layer of material. In some embodiments, one or more layers may be cavity layers that include one or more cavities. In certain embodiments, the cavities may be substantially located at the bending portions of the cushion. In some embodiments each cavity begins at the top surface of a cavity layer and extends into, but not all the way through the cavity layer. In some embodiments, the width of each cavity near the top surface of the cavity layer is wider than the width of the cavity near the bottom surface of the cavity layer. In some embodiments, the cavities may comprise spherical indentations each forming a pocket. In some embodiments, the cavities may comprise conical, egg-shaped pockets. In various embodiments, such cavities may be aligned and/or staggered in rows and/or columns. In other embodiments, each cavity may extend the width of the cavity layer and form a trench like space. In various embodiments, the cavities are located in proximity to the bending portions of the cushion. In some embodiments, the empty space provided by each cavity may prevent or decrease bunching of the cushion material at the bending portions of the cushion when the chaise is moved between different positions. In other embodiments, the cords may pass through one or more cavities as they extend through the cushion.

In further embodiments, the platform may comprise one or more foot sections that may be moved independently from the head and body sections. In some embodiments, a first foot section may be coupled to the body section at a coupling point opposite to the coupling point of the body section to the head section. In another embodiment, a second foot section may be coupled to the first foot section at a coupling point opposite the coupling point of the first foot section to the body section. In some embodiments, the foot sections and body section may be coupled by a hinge mechanism. In some embodiments, the independently moveable foot sections may allow the chaise to be configured in an "infinite" position, in which the body and head sections are fully flat and the legs sections are moved. In some embodiments, this functionality may allow a user to sit in a zero-gravity position or a Trendelenburg position whereby the feet are higher than the heart.

For example, the foot section may be configured to move downward relative to the body section such that the angle between the foot section and the body section on the topside of the chaise increases. In some embodiments the coupling point of the foot section and the body section may be substantially aligned with a user's knee joint. In another example, a first foot section may be coupled to the body section as previously described. A second foot section may be coupled to the first foot section opposite the coupling point of the first foot section to the body section. The first foot section may be configured to move upward relative to the body section such that the angle between the first foot section and the body section on the topside of the chaise decreases. The second foot section may be configured to move downward relative to the first foot section such that the angle between the first foot section and the second foot section on the topside of the chaise increases. In some embodiments, movement of the one or more foot sections may cause portions of the cushion and cover material to bend near the coupling point of the platform sections. In some embodiments, bending portions of the cushion at the foot sections may also include cavities and cords as previously described.

According to various embodiments, techniques and mechanisms are described herein with respect to configuration of a chaise. However, the techniques and mechanisms described are applicable to configuration of any style or type of furniture that may or may not be configured to move, bend, or fold. Furthermore, the techniques and mechanisms described are also applicable to a wide variety of other contexts. For instance, the techniques and mechanisms described herein are applicable to any area in which it is desired to automatically adjust the surface tension of an object to prevent bunching in layers of material.

FIG. 1 illustrates an example of a sectional sofa that can be used in conjunction with the various techniques and embodiments of the present disclosure. According to various embodiments, sectional sofa 100 includes outer frame 102, chair section 104, chair section 106, chaise section 108, cushions 110, cushions 112, and legs 114. In various embodiments, outer frame 102 may include a back portion, arm portions, and a base portion. In some embodiments, outer frame 102 may comprise a single structure supporting chair section 104, chair section 106, and chaise section 108. In other embodiments, outer frame 102 may comprise separate structures for each section 104, 106, and 108. As shown in FIG. 1, outer frame 102 forms a single structure to support chair sections 104 and 106, and a separate structure to support chaise section 108. In certain embodiments, sectional sofa 100 may include more or less chair sections as shown in FIG. 1. In certain embodiments, sectional sofa 100 may include more or less chaise sections as shown in FIG. 1. In further embodiments, sectional sofa 100 may include additional furniture sections, including, but not limited to, side tables, ottomans, consoles, etc.

Chair sections 104 and 106 include cushions 110 and chaise section 108 in include cushions 112. In some embodiments, cushions 110 and 112 may be enclosed by a cover material. In some embodiments, the cushions may rest directly on outer frame 102. In other embodiments, the cushions may be fully upholstered to the outer frame in which the cover material encloses the cushions onto the outer frame. In some embodiments, the outer frame may be fully or partially enclosed by the cover material. In other embodiments, the cushions may be coupled to a moveable internal platform that will be further described below. In some embodiments, the cushions may be upholstered to the internal platform in which the cover material encloses the cushions onto the internal platform. In some embodiments, the platform may be partially or fully enclosed by the cover material. In some embodiments, cushions 110 and 112 may comprise separate pieces or may comprise one single cushion structure. In other embodiments, cushions 110 and 112 may comprise a single cushion structure for each chair section 104 or 106, and for each chaise section 108. For example, in some embodiments, chaise section 108 includes a single cushion 112, with a backrest portion and a seat portion. In other embodiments, cushions 112 comprise a separate backrest cushion and a seat cushion.

According to various embodiments, chair sections 102 and 104, and chaise section 108, may be moved into one or more adjustable positions. For example, chaise section 108 may comprise an internal platform that includes one or more sections that may move relative to the frame and relative to each other section. The platform sections may be configured to move from a seated position into a lay flat position such that a user may lie on chaise section 108 in a supine position. In a further embodiment, chaise section 108, and chair sections 102 and 104, may be configured in any number of other positions, including, but not limited to, a semi-reclined position, a zero-gravity position, or a Tredelenberg position. In certain embodiments, movement of the platform sections may be mechanically controlled by means including, but not limited to, levers and gear mechanisms. In further embodiments, movement of the platform sections may be electronically controlled. In other embodiments, such movement of the platform sections may be wirelessly controlled.

Figure 2A:
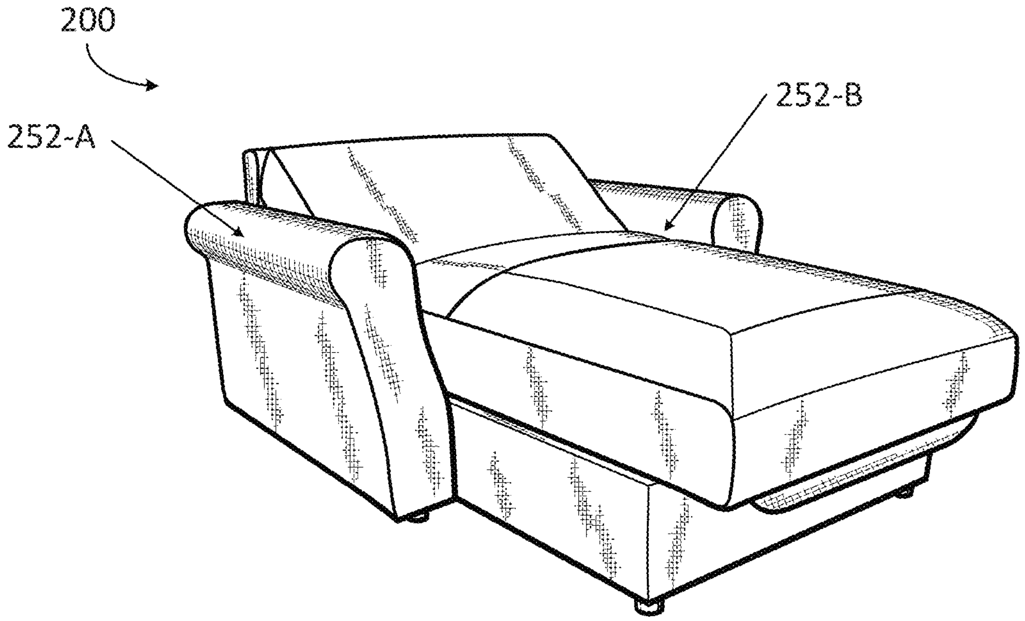
FIG. 2A illustrates an example of an adjustable chaise configured in a seated position, in accordance with one or more embodiments.
Figure 2B:
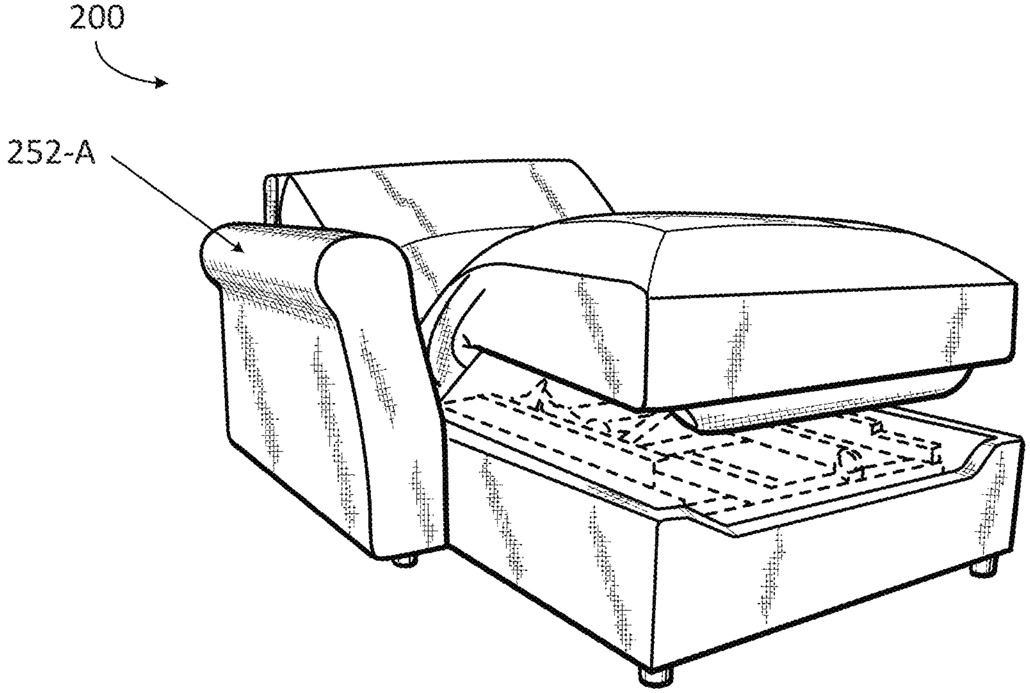
FIG. 2B illustrates an example of an adjustable chaise configured in a zero-gravity position, in accordance with one or more embodiments.
Figure 2C:
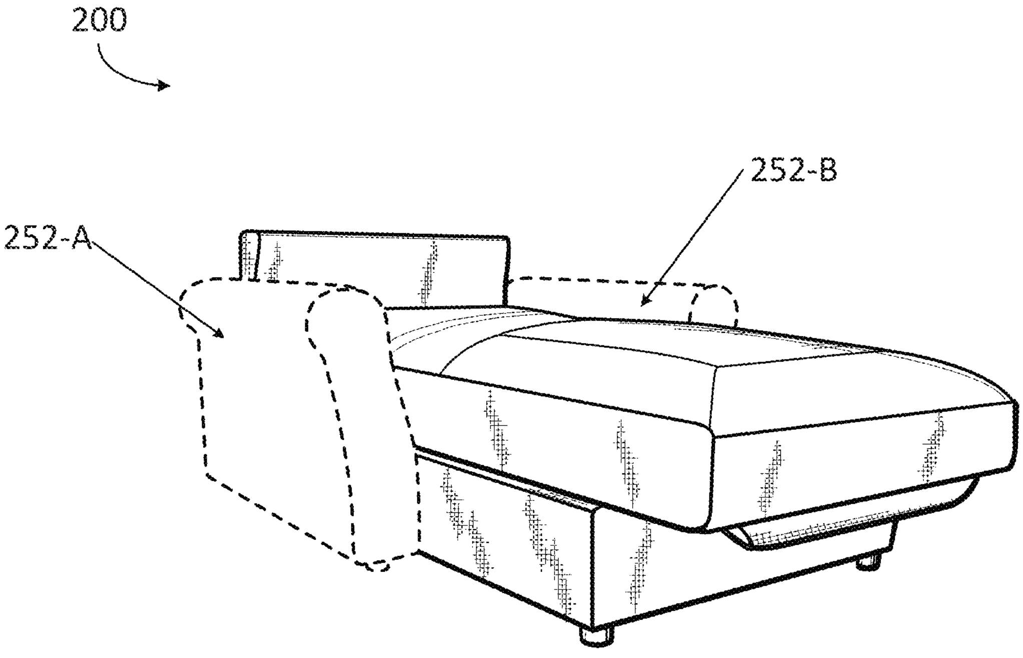
FIG. 2C illustrates an example of an adjustable chaise configured in a flat position, in accordance with one or more embodiments.
Figure 2D:
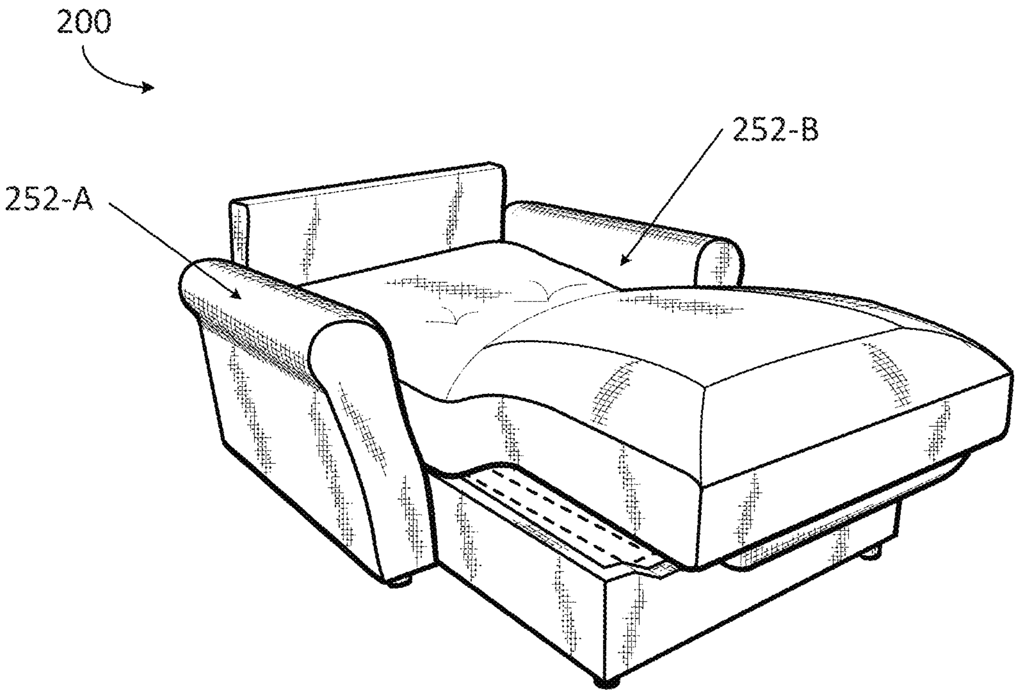
FIG. 2D illustrates an example of an adjustable chaise configured in a Tredelenberg position, in accordance with one or more embodiments.

FIG. 2A illustrates an example of an adjustable chaise 200 configured in a seated position, in accordance with one or more embodiments. Chaise 200 may include arms 252-A and 252-B. FIG. 2B illustrates an example of chaise 200 configured in a zero-gravity position, in which a section supporting a user's legs is raised from the seated position, in accordance with one or more embodiments. FIG. 2C illustrates an example of chaise 200 configured in a lay flat position, in which all sections of the chaise are in a substantially horizontal position, in accordance with one or more embodiments. In FIG. 2C, arms 252-A and 252-B are shown as optional with dotted lines. Each arm 252-A and 252-B of chaise 200 may be removed to allow chaise 200 to be coupled to a sectional sofa as a chaise section, such as chaise section 108 in FIG. 1. For example, arm 252-A may be removed to expose one side of chaise 200 so that a chair section, such as chair section 106, may be attached to that side of chaise 200. Similarly, arm 252-B may be removed so that a chair section, such as chair section 104, may be attached to the opposite side of chaise 200. Alternatively, both arms 252-A and 252-B may be removed so that chair sections, such as chair section 108 may be attached to either side of chaise 200. In some embodiments, chaise 200 may be coupled on either or both sides to another chaise section, such as chaise section 108. FIG. 2D illustrates an example of chaise 200 configured in a Tredelenberg position, in which the feet are positioned above a user's heart while the user is resting on the chaise, in accordance with one or more embodiments. In some embodiments, chaise 200 may be a chaise section, such as chaise section 108, in a sectional sofa, such as sectional sofa 100. In other embodiments, chaise 200 may be an individual piece of furniture and not coupled to any other piece of furniture. In various embodiments, chaise 200 may be continually adjusted to move into any number of positions or combination of positions.

Figure 3:
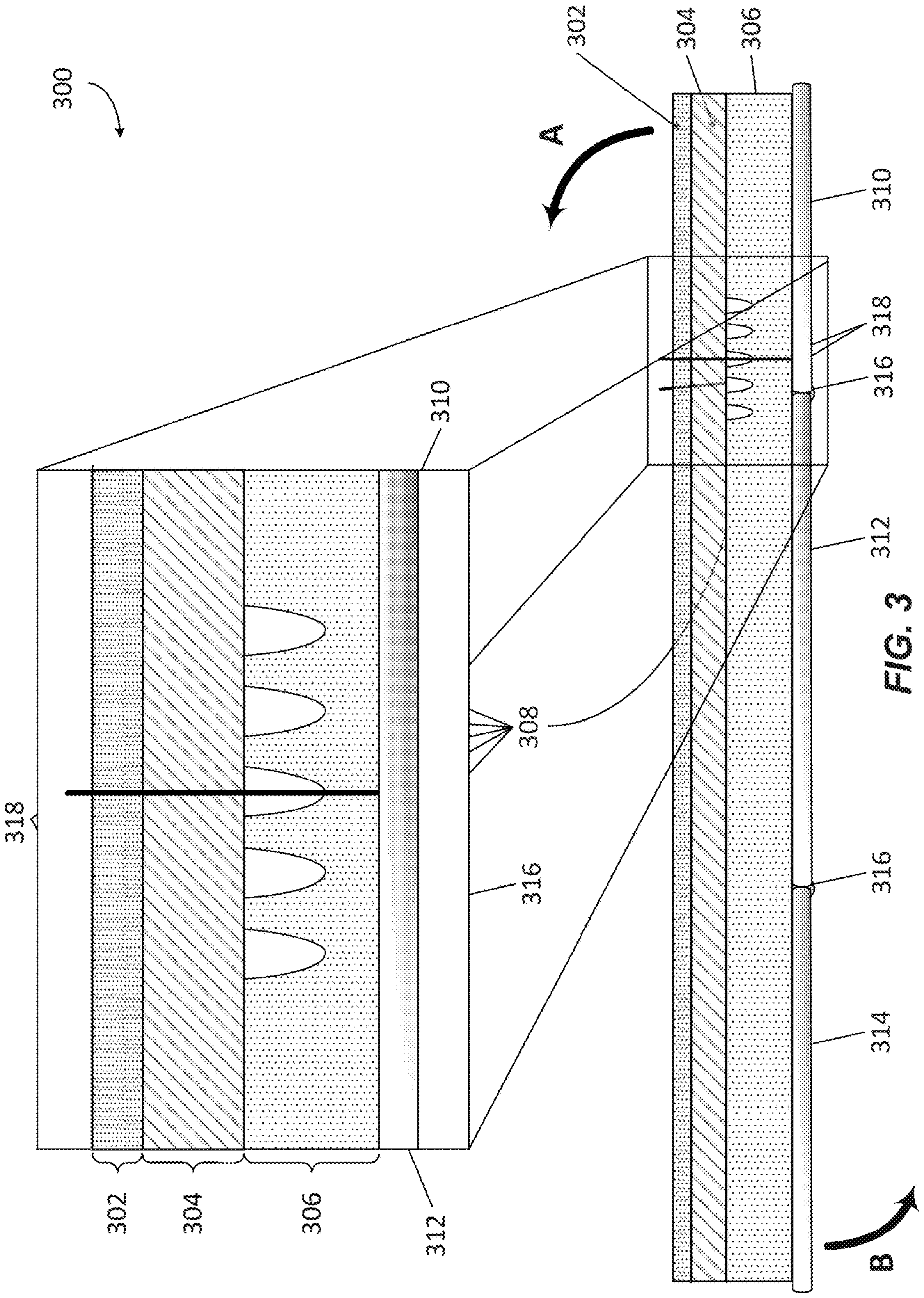
FIG. 3 illustrates a particular example of a cross-section of a platform and a cushion that may be used in conjunction with one or more embodiments of the current disclosure.

FIG. 3 is an illustration of an example of a cushion with a cavity layer that may be used in conjunction with the methods and systems of the present disclosure, in accordance with one or more embodiments. According to various embodiments, cushion 300 is a single structure comprising layer 302, layer 304, layer 306, cavities 308, and cords 318. In some embodiments, cushion 300 is coupled to a frame comprising head section 310, body section 312, and foot section 314, all connected via hinges 316. In some embodiments, cushion 300 may be cushion 112 of chaise section 108 in sectional sofa 100 shown in FIG. 1. In certain embodiments, cushion 300 may be a rectangular shaped cushion that is approximately 1760 millimeters in length and 960 millimeters wide. In other embodiments, cushion 300 may be comprise any shape to fit a particular frame or platform, and may be any desired length to fit a particular user or living space.

In various embodiments, layers 302, 304, and 306 may be comprised of materials or a combination of materials such as polyurethane foam, visco-elastic foam, closed cell foam, gel, gel visco, gel-foam, down, synthetic down, cotton, or any other material or combination of materials that provides the desired strength, firmness, softness, flexibility, cushioning, durability, weight, water resistance, or other desired physical characteristic. In an example embodiment, layer 302 may comprise 3.1 pounds of gel infused visco that is 25 millimeters in thickness. Layer 304 may comprise 4.0 pounds of visco that is 50 millimeters in thickness. Layer 306 may comprise 1.5 pounds of polyurethane foam that is 100 millimeters in thickness. In other embodiments, cushion 300 may comprise more or less layers.

In some embodiments, cushion 300 is coupled to a platform comprising one or more sections. As shown in FIG. 3, cushion 300 is coupled to a platform with head section 310, body section 312, and foot section 314. In some embodiments, cushion 300 may be attached to the platform such that there are no gaps between the bottom surface of the cushion and the top surface of each platform section 310, 312, and 314. In other embodiments, cushion 300 may be fully upholstered to platform section 310, 312, and 314 such that a cover material (not shown) fully encloses cushion 300 onto platform section 310, 312, and 314. In some embodiments, the cover material may fully or partially enclose platform section 310, 312, and 314. In some embodiments, head section 310 may be configured to move in direction A relative to body section 312 and foot section 314 may be configured to move in direction B relative to body section 312. It should be noted that in some embodiments, any of the sections can move in any of the directions A or B in order to maneuver into a desired position. In some embodiments, movement of platform sections 310, 312, and 314 into a particular configuration may cause portions of cushion 300 to bend to conform to the particular configuration.

In some embodiments layer 306 may include one or more cavities 308. Each cavity 308 begins at the top surface of layer 306 and extends into, but not all the way through layer 306. In some embodiments, the width of each cavity 308 near the top surface of layer 306 is wider than the width of the cavity near the bottom surface of layer 308. In various embodiments, cavities 308 may be alternatively, or additionally, located in other layers of cushion 300, such as layers 302 or 304. In some embodiments, cavities 308 may comprise spherical indentations each forming a pocket. In some embodiments, the spherical indentations may comprise conical, egg-shaped pockets. In various embodiments, such spherical indentations may be aligned and/or staggered in rows and/or columns. In other embodiments, each cavity 308 may extend the width of layer 308 and form a trench like space. For example, each cavity 308 may be 25 millimeters wide at the top of layer 306 and extend 40 millimeters deep into layer 306. Each cavity 308 may be spaced 15 millimeters apart from the nearest cavity 308. Layer 306 includes five rows of cavities 308. Various embodiments of cushion 300 may include any number of rows or columns of cavities 308. In other embodiments, cavities 308 are located substantially at the bending portions of cushion 300. For example, the center cavity of cavities 308 may be positioned approximately 390 millimeters from one end of cushion 300.

In some embodiments, the empty space provided by each cavity 308 may prevent or decrease bunching of the cushion material at the bending portions of the cushion when platform sections 310, 312, and 314 are moved between positions.

In various embodiments, cushion 300 may include one or more cords 318. In some embodiments, cords 318 may extend through cushion 300 with one end of each cord 318 coupled to the cover material (not shown) and the other end of each cord 318 coupled to the platform. In various embodiments, cords 318 may be coupled to any section 310, 312, or 314 of the platform. In some embodiments, each cord 318 may pass through a cavity 308 as they extend through cushion 300. In some embodiments, with cavities 308 in multiple layers of cushion, each cord 318 may pass through more than one cavity 308 as they extend through cushion 300. In further embodiments, cords 318 may be arranged in rows and/or columns along the width of cushion 300. In various embodiments, cords 318 are arranged to maintain an appropriate surface tension of the cover material at each configurable position of the chaise. The structure and function of cords 318 will be further described in FIGS. 4A and 4B.

Figure 4A:
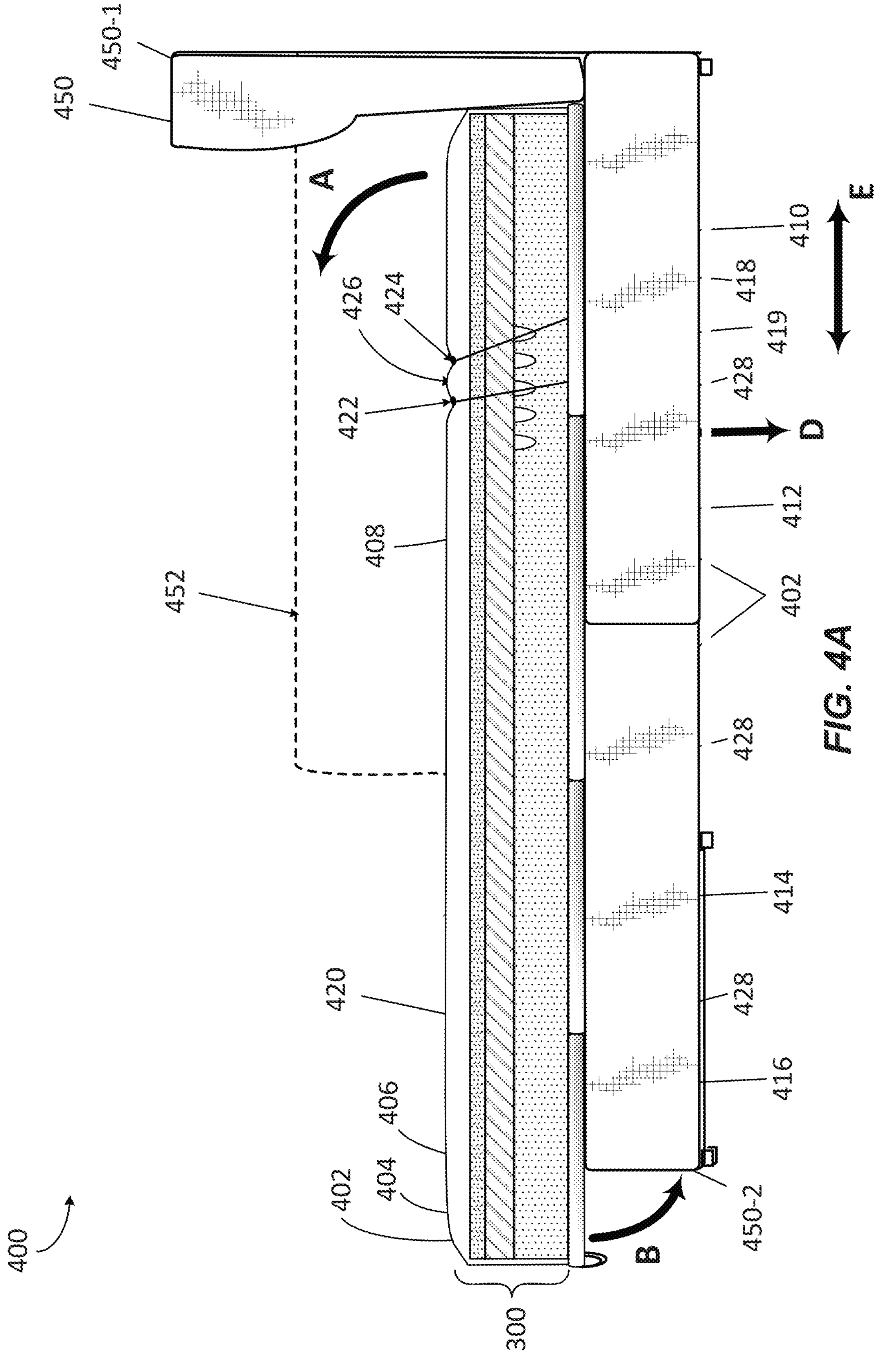
FIG. 4A illustrates a particular example of a cross-sectional view of a chaise in a flat position, in accordance with one or more embodiments.
Figure 4B:
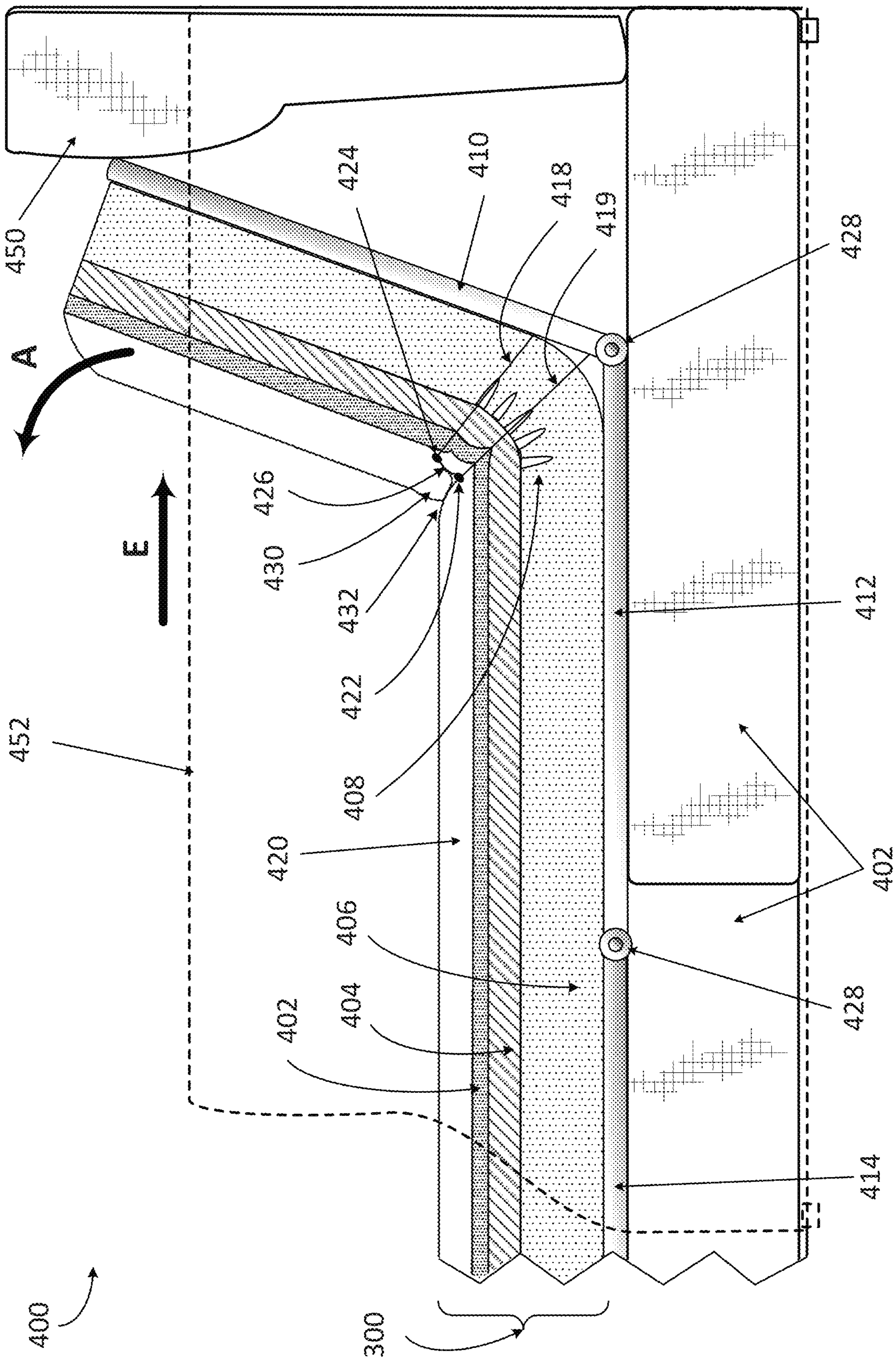
FIG. 4B illustrates a particular example of a cross-sectional view of a chaise in a seated position, in accordance with one or more embodiments.

FIG. 4A illustrates a particular example of a cross-sectional view of a chaise 400 in a lay flat position, in accordance with one or more embodiments. FIG. 4B illustrates a particular example of a cross-sectional view of a chaise 400 in a seated position, in accordance with one or more embodiments. According to various embodiments, chaise 400 includes layer 402, layer 404, and layer 406 with cavities 408. Chaise 400 further includes a frame with head section 410, body section 412, foot section 414, and foot section 416. Chaise 400 further includes cord set 418, cord set 419, cover material 420, tufts 422, tufts 424, tuft section 426, hinges 428, fold 430, crease 432, outer frame 450, and arm 452. In some embodiments, cord sets 418 and 419 attach to cover material 420 at attachment point locations 424 and 422, respectively, creating tufts 424 and 422. In various embodiments, chaise 400 may include a frame 450, including a backrest portion 450-1 and a foot rest portion 450-2, which may be stationary. Frame 450 may include one or more arms 452, which is shown as transparent in FIGS. 4A and 4B. As with arms 252-A and 252-B in chaise 200 as described in FIG. 2C, arms 453 may also be removed to allow chaise 400 to be coupled to a sectional sofa as a chaise section, such as chaise section 108 in FIG. 1. A platform with head section 410, body section 412, foot section 414, and foot section 416 may be coupled to frame 450. Body section 412 is coupled to head section 410 at one end and to foot section 414 on the opposite end. Foot section 416 is coupled to foot section 414 on the end opposite to body section 412. In some embodiments, the platform sections may be coupled by hinge mechanisms. In FIG. 4, the platform sections are coupled by hinges 428. Hinges 428 may allow each platform section to move independently from the other platform sections and allow chaise 400 to be moved into one or more configurable or adjustable positions. In various embodiments, chaise 400 may be adjusted to move into any number of positions including a lay flat position, a seated position, a semi-reclined position, an infinity positions, a zero-gravity position, etc. In some embodiments, outer frame 450 remains stationary as the platform sections are moved.

For example, in a preferred embodiment, head section 410 may move upwards in direction A in varying degrees to configure chaise 400 in a seated or semi-reclined position. Foot section 414 may move upwards in direction C to raise a user's feet in an infinity or zero-gravity position. Foot section 416 may move in direction B to remain substantially horizontal when foot section 414 has been raised upwards. In further embodiments, platform sections may be lowered in direction D to fit within outer frame 450. Similarly, in some embodiments, in order to fit within outer frame 450 while adjusting to various positions, various platform sections may also move in either direction along direction line E. For example, while moving from the lay flat position to the seated position, platform head section 410 may rotate around hinge 428 along direction A, while all platform sections, including head section 410, shift along direction line E towards the backrest portion 450-1 of outer frame 450. Similarly, when moving from the seated position back into the lay flat position, platform head section 410 rotates around hinge 428 in the reverse direction of direction A, while all platform sections shift along direction line E towards foot rest portion 450-2 of outer frame 450. Various embodiments, of chaise 400 may include platform sections moving in any combination of directions A, B, C, D, or E. In some embodiments, platform sections 410, 412, 414, and 416 may be moved manually by pushing and/or pulling on various areas of chaise 400. In certain embodiments, movement of the platform sections may be mechanically controlled by means including, but not limited to, levers and gear mechanisms. In further embodiments, movement of the platform sections may be electronically controlled. In other embodiments, such movement of the platform sections may be wirelessly controlled.

In various embodiments, chaise 400 may include a cushion such as cushion 300 as described in FIG. 3. As described in FIG. 3, the cushion of chaise 400 may be a single structure comprising multiple layers of cushion material, including layer 402, layer 404, and layer 406. In some embodiments the cushion may be coupled to the platform sections by stitching, glue, welding, screws, or any other suitable means of attachment. In other embodiments, the cushion may be further coupled to the platform sections by being fully upholstered to the platform sections. Being fully upholstered may include being enclosed by cover material 420. In some embodiments, cover 420 may fully or partially enclose platform sections 410, 412, 414, and 416. In some embodiments, cushion layers 402, 404, and 406 will bend to conform to the positioning of platform sections 410, 412, 414, and 416.

In some embodiments, layer 406 may include one or more cavities 408. As previously described, in some embodiments each cavity 408 begins at the top surface of layer 406 and extends into, but not all the way through layer 406. In some embodiments, the width of each cavity 408 near the top surface of layer 406 is wider than the width of the cavity near the bottom surface of layer 408. In various embodiments, cavities 408 may be alternatively, or additionally, located in any other layer 402, 404, or 406. In some embodiments, cavities 408 may comprise spherical indentations each forming a socket. In some embodiments, the spherical indentations may comprise conical, egg-shaped sockets. In various embodiments, such spherical indentations may be aligned and/or staggered in rows and/or columns. In other embodiments, each cavity 408 may extend the width of layer 408 and form a trench like space. Various embodiments may include any number of rows or columns of cavities 408. In certain embodiments, cavities 408 may be substantially located at the bending portions of the cushion. In FIG. 4, cavities 408 are substantially located near hinge 428 between head section 410 and body section 412. The empty space provided by each cavity 408 may promote bending of the cushion and adherence of the bottom surface of the cushion to the top surface of the platform sections when head section 410 is move in direction A relative to body section 412. The empty space may further prevent or decrease bunching of the cushion material at the bending portions of the cushion when head section 410 moves in direction A relative to body section 412.

Chaise 400 further includes cord set 418 and cord set 419 that extend through cushion layers 402, 404, and 406. Cord sets 418 and 419 each represent a group of one or more cords lined in a row across the width of the cushion. Such cords are not visible in the cross-sectional view of FIGS. 4A and 4B. Some embodiments may include more or less cord sets than as shown in FIGS. 4A and 4B. Each cord in cord sets 418 and 419 has one end coupled to platform section 410 and another end coupled to cover material 420 at tufts 422 and 424. In other embodiments, one end of each cord in cord sets 418 and 419 may be coupled to any portion of any platform section 410, 412, 414, or 416. Each cord is coupled to cover material 420 at attachment points, such as locations 422 and 424, thus creating tufts 422 and 424. In other embodiments, tufts 422 and 424 are aesthetic in function and created via a separate tufting technique. In such embodiments, the attachment points of cord sets 418 and 419 may or may not be located in the same position as tufts 422 and 424. In some embodiments, only one cord is attached at an attachment point. In other embodiments, multiple cords may be attached at each attachment point. In various embodiments, the cords of cord sets 418 and 419 may be comprised of materials or a combination of materials such as knit, nylon, or any other material or combination of materials that provides the desired strength, firmness, flexibility, durability, elasticity, weight capacity, or other desired physical characteristic.

Each cord may be coupled to cover material 420 by any suitable means such as stitching, glue, button, etc. For example, each cord in cord sets 418 and 419 may be attached to cover material 420 at attachment points, including attachment points 422 and 424, by a shank style button which includes a metal, plastic, or wire loop through which a cord 418 is fed and then passed through layers 402, 404, and 406 of the cushion. The cords are under tension such that an indentation forms at the attachment point of each cord, thus creating tufts 422 and 424. In some embodiments, one or more cords may be attached at specified intervals over the surface of cover material 420 to create a desired tufted appearance with one or more tufts. For example cord sets 418 and 419 may each represent a row of two cords each such that four cords are coupled to cover material 420 at four separate attachment points causing indentations to be formed in cover material 420 at each attachment point. In other embodiments, the cords may be arranged closely together in rows such that no single indentation appears. Instead, a single crease may appear in cover material 420 along the attachment points of each row of cords 418.

FIG. 4B demonstrates how the upholstery self-adjusts as the chaise moves from a lay-flat position into a seated position. In FIG. 4B, chaise 400 has been moved to a seated position by lifting head section 410 upward in direction A relative to body section 412. In some embodiments, the entire platform structure may be moved in direction E so that head section 410 remains in contact with outer frame 450. As head section 410 is moved in direction A, the angle and area between head section 410 and body section 412 decreases. Normally, this decrease in area would cause excess material to form in cover material 420 that may bunch up at the bending portions of cushion 300 substantially aligned with hinge 428 to disrupt the comfort of a user or the smooth lines of the chaise. However, the difference in tensions provided by cord sets 418 and 419 may prevent this bunching of cover material 420. Movement of head section 410 causes the tension of cord sets 418 and 419 to adjust such that as head section 410 is moved in direction A, the tension on the cords in cord sets 418 and 419 increase to pull the cover material at the each attachment point, including attachment points 422 and 424, toward the platform. The increased pull force on cover material 420 may cause tuft section 426 to be pulled toward the platform and cause fold 430 to form in cover material 420. Fold 430 may fold over tuft section 426 to form crease 432 to substantially hide tuft section 426 and any excess material of cover material 420.

In various embodiments, each cord set may be arranged to pull cover material 420 with different amounts of tension. For example, movement of head section 410 may cause the tension of cord sets 418 and 419 to adjust unequally such that cords in cord set 419 increase in tension more than cords in cord set 418. Such difference in tension may promote the formation of fold 430. In other embodiments, the initial tensions of cord sets 418 may differ from the initial tensions of cord set 419. For example, the initial tension of cord set 419 (the tension while chaise 400 is in the lay flat position) may already be higher than the initial tension of cord set 418. Thus, during movement of chaise 400 from the lay flat position into the seated position, the cord sets may increase the same amount, but ultimately end up with different tension values in order to promote formation of fold 430.

Figure 5A:
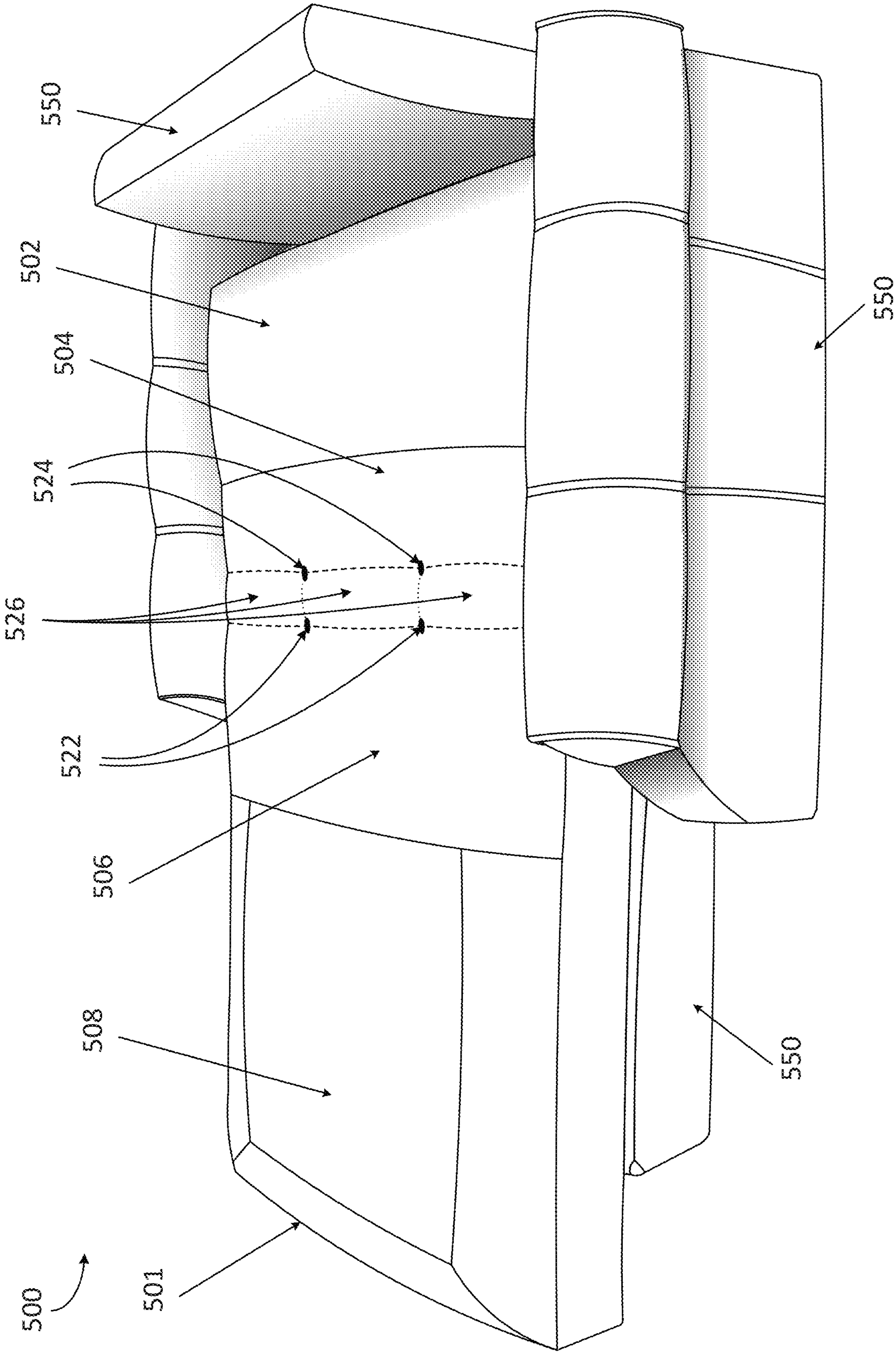
FIG. 5A illustrates a particular example of a chaise in a flat position, in accordance with one or more embodiments.
Figure 5B:
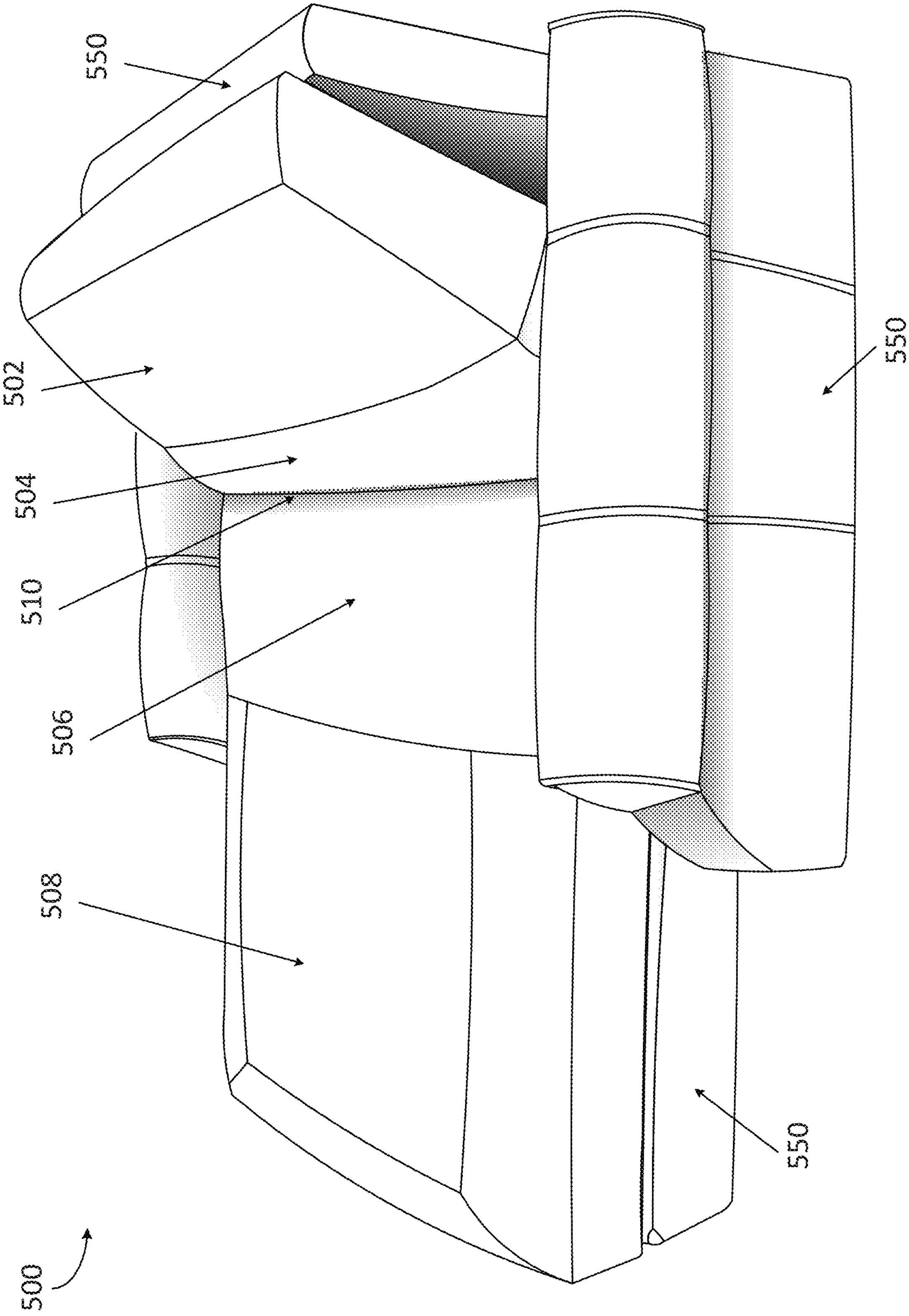
FIG. 5B illustrates a particular example of a chaise in a seated position, in accordance with one or more embodiments.

FIG. 5A illustrates a particular example of a chaise in a flat position, in accordance with one or more embodiments. FIG. 5B illustrates a particular example of a chaise in a seated position, in accordance with one or more embodiments. According to various embodiments, chaise 500 may be an alternate view of chaise 400 described in FIGS. 4A and 4B. Chaise 500 includes a cushion 501 with portion 502, portion 504, portion 506, and portion 508. Chaise 500 further comprises tufts 522, tufts 524, tuft sections 526, and outer frame 550. The cushion 501 of chaise 500 may be a cushion such as cushion 300 coupled to platform with sections such as head section 310 and body section 312. The cushion 501 of chaise 500 may be upholstered to a platform by a cover material, such as cover material 420. Outer frame 550 of chaise 500 may also be upholstered with a cover material, such as cover material 420. The upholstered cushion of chaise 500 has been divided into portions for explanatory purposes and includes portion 502, portion 504, portion 506, and portion 508. However, as mentioned above, cushion 501 may be a singular cushion upholstered to the platform, according to various embodiments of the present disclosure. The cushion of chaise 500 may also include one or more cords extending through the cushion and coupled to the cover material and platform, as described in FIG. 3. In FIG. 5, cords (not shown) are coupled to the cover material at attachment points directly underneath tufts 522 and 524. In some embodiments, each cord may be coupled to the cover material by any suitable means such as stitching, glue, button, etc.

The cords of chaise 500 are arranged in two rows of two and are under tension causing indentations, or tufts, to form in the cover material at locations 522 and 524. In other embodiments, attachment points may be arranged to achieve any desired tufted appearance. In other embodiments, the cords may be arranged closely together in rows such that no single indentation appears. Instead, a single crease may appear in the cover material along the attachment points of each row of cords. In some embodiments, the cords maintain an appropriate surface tension in the cover material when chaise 500 is in the flat position such that a user laying on chaise 500 will not feel any gaps caused by attachment points, thus reproducing the feeling of lying on a bed mattress, as opposed to separate sections of cushions coupled together in a semi or fully reclined positioned.

Chaise 500 is shown in a seated position in FIG. 5B. This movement may be caused by movement of platform sections as described in FIGS. 4A and 4B, which may cause the cushion of chaise 500 to conform to configured position. As further described in FIGS. 4A and 4B, movement of platform sections may cause tension of the cords to increase to pull tuft section 526 toward the platform and cause a fold, such as fold 430, to form in portion 504 and substantially cover tufts 522 and 524, as well as tuft section 526, resulting in the formation of a single, clean and aesthetically pleasing crease 510. In this way, any bunching in the cover material is eliminated and/or hidden and the lines of chaise 500 are not disrupted. Furthermore, a user sitting on chaise 500 will not feel any bunching of the cover material in the seated position.

Figure 6:
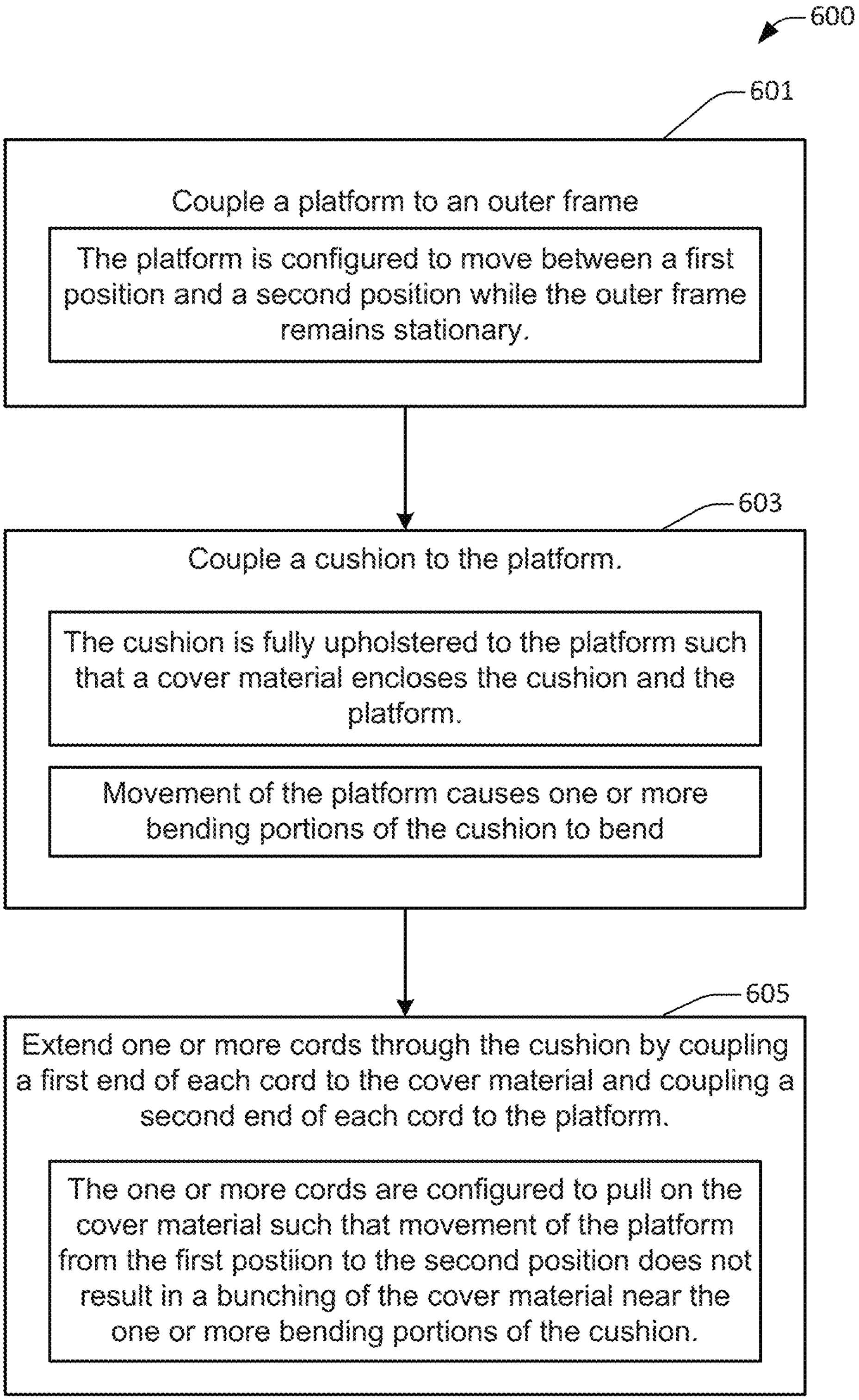
FIG. 6 illustrates an example of a method of assembling a chaise, in accordance with one or more embodiments.

FIG. 6 illustrates an example of a method for assembling a chaise, in accordance with one or more embodiments. At 601, a platform is coupled to an outer frame. The platform may be configured to move between a first and a second position while the outer frame remains stationary. In some embodiments, the outer frame may be outer frame 450 as described in FIGS. 4A and 4B. The platform may be a platform with sections such as sections 310, 312, and 314 as described in FIG. 3. The platform sections may be coupled together by a hinge mechanism such as hinges 428 as described in FIGS. 4A and 4B. In some embodiments, the hinge mechanisms may allow each platform section to move in conjunction with and/or independently from the other platform sections and allow the chaise to be moved into one or more adjustable positions. In various embodiments, the chaise may be configured to be able to adjust into any number of positions including a lay flat position, a seated position, a semi-reclined position, an infinity position, a zero-gravity position, etc. In some embodiments, outer frame 450 remains stationary as the platform sections are moved.

At 603, a cushion is coupled to the platform. In some embodiments, the cushion may be a single cushion 300 and consist of one or more layers of cushion material, such as layers 302, 304, and 306. In other embodiments, the cushion may comprise several different cushions coupled to the platform. In some embodiments, the cushion may be attached to the platform such that there are no gaps between the bottom surface of the cushion and the top surface of each platform section. In some embodiments, the cushion is fully upholstered to the platform such that a cover material encloses the cushion and the platform. The cover material may be cover material 420 as described in FIGS. 4A and 4B. In some embodiments, the cushion may be fully upholstered to the platform such that the cover material fully encloses the cushion onto the platform. In some embodiments, the cover material may fully or partially enclose the platform. In some embodiments, the cushion will bend at bending portions to conform to the positioning of platform sections. In some embodiments, one or more layers of cushion material may include cavities, such as cavities 408, to promote bending at the bending portions of the cushion.

At 605, one or more cords are extended through the cushion with a first end of each cord coupled to the cover material and a second end of each cord coupled to the platform. The cords may be cords 318 and arranged in rows, such as cord sets 418 and 419. In various embodiments, the cords may be attached to any section of the platform. In various embodiments, the cords may be attached to attachment points on the cover material by any suitable means, including, but not limited to, stitching, glue, button, etc. In some embodiments, only one cord is attached at an attachment point. In other embodiments, multiple cords may be attached at each attachment point. For example, the cords may be coupled to the cover material by a shank style button which includes a metal, plastic, or wire loop through which a cord is fed and then passed through layers of the cushion. In some embodiments, the cords may be under tension such that an indentation forms at the attachment point of each cord, creating tufts, such as tufts 522 and 524. In some embodiments, one or more cords may be attached at specified intervals over the surface of the cover material to create a desired tufted appearance with one or more tufts.

The one or more cords are configured to pull on the cover material such that movement of the platform from the first position to the second position does not result in a bunching of the cover material near the one or more bending portions of the cushion. For example, the cords may pull on the cover material as described in FIG. 4B such that a portion of the cushion, such as tuft section 526 is pull toward the platform. As further described in FIG. 4B, such pulling may cause a fold, such a fold 430, to form in the cover material and cover tuft section 526 and the attachment points. In some embodiments, this may eliminate or hide any bunching of the cover material and result in the creation of a single crease, such as crease 510.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A chaise comprising:

a stationary section; and a moveable section, the moveable section configured to move between a first position and a second position, wherein the moveable section includes a cushion and cover material covering the cushion, wherein movement of the moveable section causes one or more bending portions of the cushion to bend, wherein the moveable section is configured such that bending of the one or more bending portions does not result in a bunching of the cover material near the one or more bending portions due to a pulling mechanism that pulls the cover material inward such that attachment points of the pulling mechanism and portions of the cover material located between two rows of the pulling mechanism are hidden by other portions of the cover material that are not pulled by the pulling mechanism, thereby causing the other portions of the cover material that are not pulled by the pulling mechanism to fold over the attachment points to form an uninterrupted crease.

2. The chaise of claim 1, wherein movement of the moveable section from the first position to the second position causes one or more pulling mechanisms to pull a portion of the cover material towards the moveable section to prevent bunching of the cover material at one or more bending portions.

3. The chaise of claim 1, wherein the moveable section comprises a plurality of sections, including a head section coupled to a body section;

wherein movement of the head section relative to the body section causes one or more bending portions of the cushion to bend near a coupling point of the head section and the body section.

4. The chaise of claim 3, wherein the moveable section further comprises a foot section coupled to the body section.

5. The chaise of claim 4, wherein the foot section is independently moveable from the body section and the head section such that the moveable section is configured to move to a third position and a fourth position, and wherein movement of the foot section relative to the body section causes one or more bending portions of the cushion to bend near a coupling point of the foot section and the body section.

6. The chaise of claim 1, wherein one or more pulling mechanisms are arranged to maintain an adjustable surface tension on the cover material, wherein the surface tension of the cover material adjusts as the moveable section moves such that there is no pinching or bunching of the cover material.

7. The chaise of claim 1, further comprising a motor arrangement, wherein the motor arrangement causes the moveable section to move into one or more configurable positions by automated electronic movement.

8. A method comprising:

assembling sections of a chaise, the chaise including:

a stationary section; and a moveable section, the moveable section configured to move between a first position and a second position, wherein the moveable section includes a cushion and cover material covering the cushion; and coupling the stationary section to the moveable section such that movement of the moveable section causes one or more bending portions of the cushion to bend, wherein the moveable section is configured such that bending of the one or more bending portions does not result in a bunching of the cover material near the one or more bending portions due to a pulling mechanism that pulls the cover material inward such that attachment points of the pulling mechanism and portions of the cover material located between two rows of the pulling mechanism are hidden by other portions of the cover material that are not pulled by the pulling mechanism, thereby causing the other portions of the cover material that are not pulled by the pulling mechanism to fold over the attachment points to form an uninterrupted crease.

9. The method of claim 8, wherein movement of the moveable section from the first position to the second position causes one or more pulling mechanisms to pull a portion of the cover material towards the moveable section to prevent bunching of the cover material at one or more bending portions.

10. The method of claim 8, wherein the moveable section comprises a plurality of sections, including a head section coupled to a body section;

wherein movement of the head section relative to the body section causes one or more bending portions of the cushion to bend near a coupling point of the head section and the body section.

11. The method of claim 10, wherein the moveable section further comprises a foot section coupled to the body section;

wherein the foot section is independently moveable from the body section and the head section such that the moveable section is configured to move to a third position and a fourth position;

wherein movement of the foot section relative to the body section causes one or more bending portions of the cushion to bend near a coupling point of the foot section and the body section.

12. The method of claim 8, wherein one or more pulling mechanisms are arranged to maintain an adjustable surface tension on the cover material, wherein the surface tension of the cover material adjusts as the moveable section moves such that there is no pinching or bunching of the cover material.

13. The method of claim 8, wherein the chaise further comprises a motor arrangement, wherein the motor arrangement causes the moveable section to move into one or more configurable positions by automated electronic movement.

14. A sectional sofa comprising:

one or more seat sections;

one or more chaise sections, wherein at least one chaise section comprises:

a stationary section; and a moveable section, the moveable section configured to move between a first position and a second position, wherein the moveable section includes a cushion and cover material covering the cushion, wherein movement of the moveable section causes one or more bending portions of the cushion to bend, wherein the moveable section is configured such that bending of the one or more bending portions does not result in a bunching of the cover material near the one or more bending portions due to a pulling mechanism that pulls the cover material inward such that attachment points of the pulling mechanism and portions of the cover material located between two rows of the pulling mechanism are hidden by other portions of the cover material that are not pulled by the pulling mechanism, thereby causing the other portions of the cover material that are not pulled by the pulling mechanism to fold over the attachment points to form an uninterrupted crease.

15. The sofa of claim 14, wherein movement of the moveable section from the first position to the second position causes one or more pulling mechanisms to pull a portion of the cover material towards the moveable section to prevent bunching of the cover material at one or more bending portions.

16. The sofa of claim 14, wherein the moveable section comprises a plurality of sections, including a head section coupled to a body section;

wherein movement of the head section relative to the body section causes one or more bending portions of the cushion to bend near a coupling point of the head section and the body section.

17. The sofa of claim 16, wherein the moveable section further comprises a foot section coupled to the body section.

18. The sofa of claim 17, wherein the foot section is independently moveable from the body section and the head section such that the moveable section is configured to move to a third position and a fourth position, and wherein movement of the foot section relative to the body section causes one or more bending portions of the cushion to bend near a coupling point of the foot section and the body section.

19. The sofa of claim 14, wherein one or more pulling mechanisms are arranged to maintain an adjustable surface tension on the cover material, wherein the surface tension of the cover material adjusts as the moveable section moves such that there is no pinching or bunching of the cover material.

20. The sofa of claim 14, further comprising a motor arrangement, wherein the motor arrangement causes the moveable section to move into one or more configurable positions by automated electronic movement.

* * * * *